United States Patent [19]

Jonson

[11] 4,230,004
[45] Oct. 28, 1980

[54] METHOD OF SAWING AND STACKING BOARD

[75] Inventor: Sven M. Jonson, Sundsvall, Sweden

[73] Assignee: Möhög AB, Sundsvall, Sweden

[21] Appl. No.: 881,854

[22] Filed: Feb. 27, 1978

[30] Foreign Application Priority Data

Mar. 11, 1977 [SE] Sweden .............................. 7702805

[51] Int. Cl.³ .............................................. B27B 5/06
[52] U.S. Cl. ......................................... 83/23; 83/47; 83/86; 83/408; 144/326 R
[58] Field of Search .............. 83/23, 47, 86, 90, 404.1, 83/404.2, 408; 144/326

[56] References Cited

U.S. PATENT DOCUMENTS

| | | |
|---|---|---|
| 3,570,561 | 3/1971 | Frodermann et al. .............. 83/47 X |
| 3,826,164 | 7/1974 | Campbell ................................... 83/23 |
| 4,054,070 | 10/1977 | Steilling ............................... 83/47 X |

FOREIGN PATENT DOCUMENTS 1428268 3/1976 United Kingdom ........................ 83/47

*Primary Examiner*—Donald R. Schran
*Attorney, Agent, or Firm*—Toren, McGeady and Stanger

[57] ABSTRACT

A method of sawing and stacking sheets of fiberboard and similar material includes placing a first sheet to form a support. A plurality of second sheets are now divided into smaller sheets and are stacked on the first sheet without altering their positions in relation to each other.

5 Claims, 7 Drawing Figures

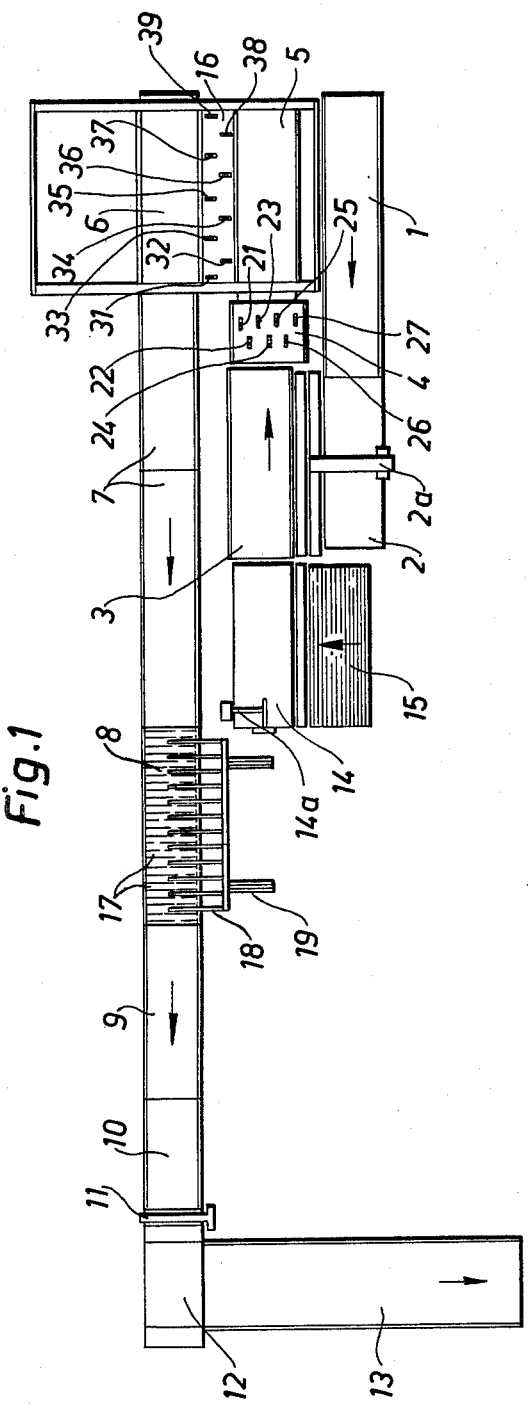

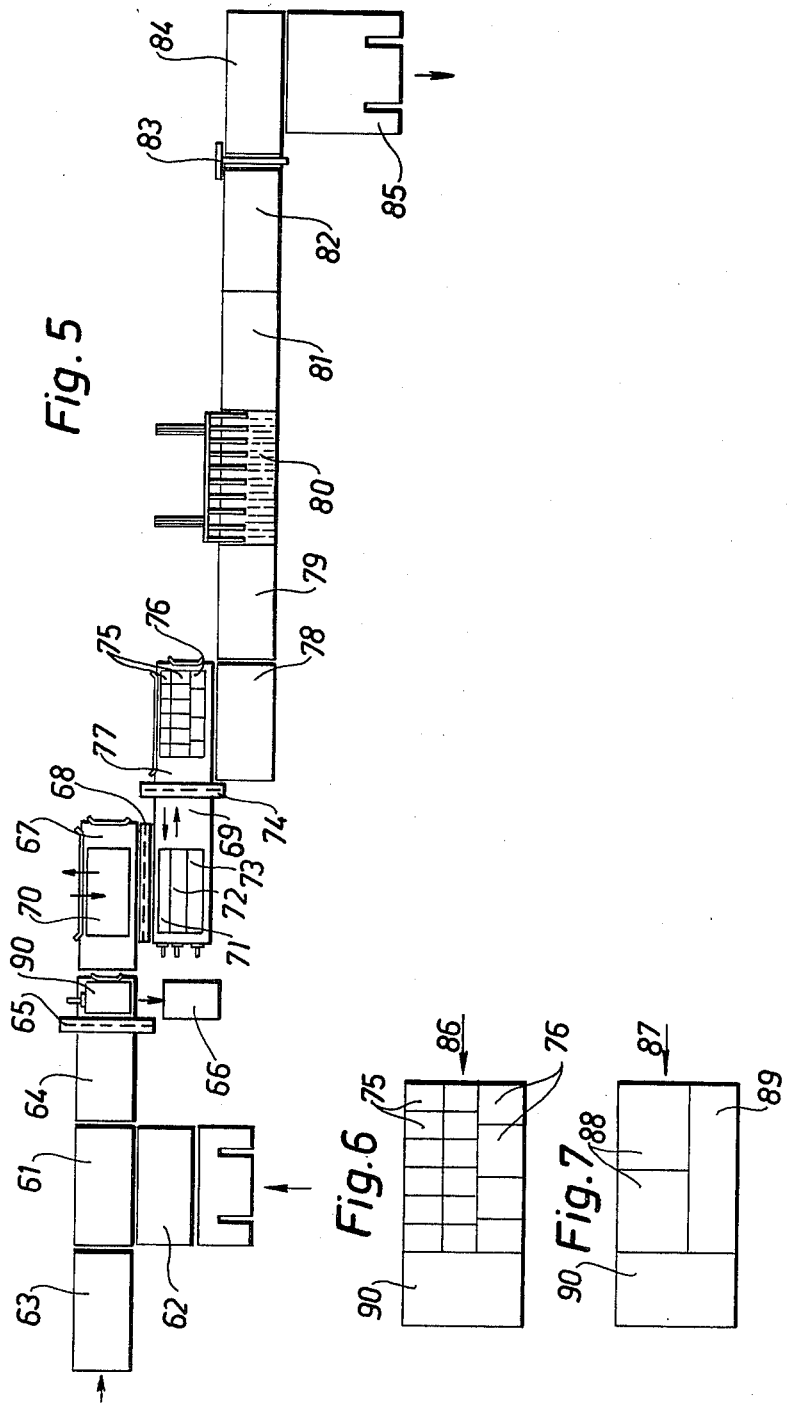

METHOD OF SAWING AND STACKING BOARD

The invention relates to a method of sawing and stacking board. By board is meant particle board, fiberboard and the like. Particle board is board made from chips or flakes of wood, bonded together with a resin.

Sheets of board are normally of extremely large size when manufactured. When they are then cut to form smaller sheets this is usually performed by sawing, the sheets being sawn into small sheets which are then stacked and, if desired, also wrapped. Frequently each stack of sheets is wrapped individually, generally by two or more strips being clamped around the stack.

The object of the present invention is to effect a method enabling sheets to be sawn and stacked, and possibly also wrapped, in a simple manner, several stacks of sheets forming a single large packet. A particular object of the invention is to enable such large packets to be manipulated with the help of a fork truck.

The method according to the invention is characterized in that at least a first sheet is placed on a stacking table, and thereafter a plurality of second sheets, having substantially the same size as the first sheet, are divided by a saw cut into at least two smaller sheets, and that these smaller sheets are stacked, without altering their positions in relation to each other, on the first sheet lying on the stacking table, the first sheet thus forming a supporting surface for at least two stacks of smaller sheets. The first sheet, together with the small sheets stacked thereon, thus forms a single packet which can be wrapped if desired.

In accordance with this method the first sheet is placed whole on the stacking table in order to form the support surface for smaller sheets. It should be noted, however, that it is preferable to saw the edges of the sheet straight, which usually entails removing a strip 10–20 mm wide from the edges of the sheet. The sheet arriving on the stacking table is thus slightly smaller than the original sheet. The other sheets which are to be cut into smaller sheets should also preferably be cut straight at the edges first. The original sheet used for the first as well as the other sheets should preferably have the same size, preferably sheets produced by the same particle board press or the like.

According to a preferred embodiment, however, the first sheet is also divided before being placed on the stacking table. This method is characterized in that a first sheet is first divided into at least two part-sheets, that these part-sheets are placed, without altering their positions in relation to each other, on a stacking table, and that thereafter a plurality of second sheets are divided into smaller sheets, at least some of which are smaller than the part-sheets already cut, that these smaller sheets are stacked, without altering their positions in relation to each other, on the part-sheets lying on the stacking table, each part-sheet forming a support surface for one or more stacks of smaller sheets. The sheets may be divided by means of known sawing methods. A sawing method is preferred according to which the sheets to be cut are conveyed on a first saw table where they are cut in a first direction by a number of circular saw blades, and are subsequently conveyed on a second saw table where they are cut in a second direction by a number of circular saw blades, after which the small sheets thus produced are stacked and, if desired, also wrapped. This embodiment of the invention is applied in this way. A number of circular saw blades in the first and second saw tables are lowered below the plane of the saw table. At least one saw blade, as well as any edge trimming saw blades, is still in operative position. A first sheet is now conveyed along the first and the second saw tables, so that this sheet is cut into at least two part-sheets. The lowered saw blades are now raised to operative position. A plurality of second sheets are now conveyed along the first and second saw tables, to be cut into smaller sheets. The smaller sheets thus formed are stacked, without altering their positions in relation to each other, on the part-sheets produced previously. Each individual part-sheet with its stack of smaller sheets is now, if desired, wrapped to form a package.

The sheet first placed on the stacking table will thus form a support surface for at least one, usually at least two, stacks of small sheets which may be of the same or of different size. The first sheet is only used for transporting the smaller sheets and may therefore be a reject or second-quality sheet. Alternatively, the first sheet may consist of a loading pallet, or of, several loading pallets placed next to each other. However, the use of loading pallets is limited by the fact that they can only be manufactured in a few standardized sizes. A particle board or fiberboard to be used as support surface, however, need only be used once and may therefore be cut to exactly the desired size.

The invention will now be explained with reference to the accompanying drawings.

FIG. 1 shows schematically an installation for performing the method according to the invention.

FIG. 2 shows a sheet cut into four part-sheets.

FIG. 3 shows a sheet cut into 30 smaller sheets which can then be stacked on the part-sheets shown in FIG. 2.

FIG. 4 shows a sheet-package in finished state.

FIG. 5 shows schematically another installation for performing the method according to the invention.

FIGS. 6 and 7 show how these sheets can be cut.

The installation according to FIG. 1 compises a conveyor belt 1 on which stacks of the sheets to be cut are carried in the direction of the arrow so that they arrive on a vertically adjustable feed table 2. The sheets are fed one by one by a feeder 2a onto a conveyor 3. This conveyor 3 can also be supplied with sheets from a vertically adjustable feed table 14 provided with a feeder 14a. Stacks of sheets are supplied to the feed table 14 by a conveyor 15. The sheets are directed in longitudinal direction by the conveyor 3 to a first saw table 4 having seven circular saw blades 21–27 which cut the sheets in longitudinal direction. The circular saw blades 21 and 27 are edge saws which merely trim the edges of the sheets. To economize on space the circular saw blades are placed in two rows, numbers 21, 23, 25 and 27 being in one row and numbers 22, 24 and 26 in another row. All the blades except the edge blades 21 and 27 can be raised or lowered, so that from their active position they can be lowered to an inoperative position below the plane of the table.

The saw table 4 passes the cut sheets to a conveyor 5 which then conveys them in transverse direction to a second saw table 16 having nine circular saw blades 31 to 39 which cut the sheets in their transverse direction. The outermost saw blades 31 and 39 are edge trimming saws in this case also. Also in this saw table the saw blades, except for the edge trimming saws, are vertically adjustable and placed in two rows, numbers 31, 33, 35, 37 and 39 being in one row and numbers 32, 34, 36 and 38 in another row.

The saw table 16 feeds the sawn sheets onto a vertically adjustable stacking table 6 where they are stacked in the same pattern as that in which they were sawn. When stacks of the desired height have been formed they are carried by the conveyor 7 to a separator 8 where they are separated in transverse direction. The separator comprises rollers 17 forming a roller conveyor, and a grill consisting of a plurality of parallel bars 18 which are moved up and down, by a lifting mechanism, not illustrated, between the rollers 17. The grill and lifting mechanism are fitted on two rails 19 so that they can be moved to and fro in parallel with the direction of the bars 18. The grill is placed below the stacks furthest to the left, seen in the direction of transport, and is now raised so that these stacks are lifted from the roller conveyor. The stacks remaining on the roller conveyor are now carried further to the first of two conveyors 9 and 10 arranged one after the other. The bars 18 are now laterally displaced so that the remaining stacks are aligned with and behind those already on the conveyor 9. The bars are now lowered and the stacks arrive on the roller conveyor. They are now passed on to the conveyor 9.

The stacks are next separated in longitudinal direction, i.e. in the direction of transport, with the help of the conveyors 9 and 10. When the first group of stacks to be packed together has come so far that it has just left the conveyor 9 and entered the conveyor 10, the conveyor 9 is stopped. The stacks on the conveyor 10 are taken to a wrapping apparatus 11 where strips are placed around the stacks tying them together into a package. The package is finally carried out of the installation on conveyors 12 and 13.

After this general description of the installation, we shall now show how the package of sheets according to FIG. 4 is produced from the sheets illustrated in FIGS. 2 and 3.

The sheet 41 according to FIG. 2 is preferably a reject sheet which is fed into the longitudinal saw table 4 from a stack of sheets on the feed table 14, via the conveyor 3. In the longitudinal saw table 4 the circular saw blades 22, 23, 25 and 26 have been lowered to inoperative position and the saw blades 21, 24 and 27 are in operative position. The saw blades 21 and 27 will therefore trim the edges of the sheet along saw cuts 21a and 27a, whereas the saw blade 24 divides the sheet into two part-sheets along a saw cut 24a. When the sheet is thereafter fed through the transverse saw 16 the saw blades 32, 33, 34, 36, 37 and 38 are lowered and inoperative whereas the saw blades 31, 35 and 39 are in operative position. The blades 31 and 39 will therefore trim the edges of the sheet along the saw cuts 31a and 39a, whereas the saw blade 35 cuts the sheet across along a saw cut 35a. The sheet 41 has thus divided into four part-sheets 42–45. These part-sheets are placed on the stacking table 6 without altering their positions in relation to each other. i.e. in the pattern shown in FIG. 2.

The sheet 46 show in FIG. 3 is fed into the longitudinal saw 4 from a stack of sheets on the feed table 2 via the conveyor 3. In the longitudinal saw 4 the previously lowered circular saw blades have again been raised so that all the saw blades 21–27 are in operative position. Thus, by means of corresponding saw cuts 21a–27a the sheet will be trimmed at the edges and divided into six part-sheets, i.e. three narrow sheets 47 and three wider sheets 48. These part-sheets are now fed through the transverse saw 16 in two groups. The part-sheets 47 are sawn first. All the saw blades except 33 and 37 are at this time in operative position. Each part-sheet 47 will thus be cut clean at the edges and divided into six smaller sheets 49. The saw blades 32, 34, 36 and 38 are then lowered to inoperative position, the saw blades 33 and 37 raised to operative position and the part-sheets 48 passed through the transverse saw. Each part-sheet 48 will thus be cut clean at the edges and divided into four smaller sheets 50.

The smaller sheets 49, 50 thus obtained are now stacked in the same pattern as that into which they have been sawn on the part-sheets 42–45 cut earlier. Each part-sheet 42, 43 will thus carry nine smaller sheets 49, whereas each part-sheet 44, 45 will carry six smaller sheets 50. Smaller sheets of the type shown in FIG. 3 are now cut and stacked in this manner until a stack of the desired height has been formed on the stacking table 6. This stack is now transported to the separator 8 so that the stacks can be separated sideways as described earlier. When the stacks have been separated in the direction of transport by means of the conveyors 9 and 10, as described earlier, each stack is wrapped individually in the wrapping apparatus 11. One of the packages thus formed is illustrated in FIG. 4. The package consists of one part-sheet 43 and nine stacks of smaller sheets 49. Wooden laths 51 are preferably placed under the part-sheet 43 and the whole is tied together with strips 52 Since the part-sheet 43 is raised from the floor the complete package can be manipulated by means of a fork truck.

The arrangement according to FIG. 5 includes a conveyor 61 which can be supplied with sheeets from two feed tables 62 and 63. The sheets are carried one by one, or in small piles of sheets, by the conveyor 61 to a first saw table 64 on which is mounted a first cross-cut saw 65. This saw consists of a track on which a single circular saw blade slides to and fro. The spring cross-cut saw 65 cuts the sheet to give a sheet 70 of desired length. The piece 90 left over is ejected to a stacking table 66. The saw table 64 now feeds the sheet 70 to a second saw table 67 on which is mounted a second cross-cut saw 68. This saw divides the sheet into a number of strips, in the case shown three-strips 71–73. These strips are fed by the saw table 67 in transverse direction to a third saw table 69 on which is mounted a third cross-cut saw 74. The saw table 69 is provided with a plurality of feeding members so that each strip 71–73 can be passed individually past the saw 74 and thus be cut in transverse direction. In the case shown the strips 71 and 72 are divided in the same way, i.e. to form six smaller sheets 75 each, and are therefore fed simultaneously past the saw 74. The strip 73 is cut into four smaller sheets 76. The smaller sheets 75, 76, thus formed, are placed on a receiving table 77 without altering their positions in relation to each other, and are passed over to a stacking table 78, still in the same relative positions. When stacks of the desired height have been formed, they are dealt with in the same way as has been described in connection with FIG. 1, that is they pass a conveyor 79, a separator 80 to separate the stacks in the transverse direction, conveyors 81, 82 to separate the stacks in longitudinal direction, a wrapping apparatus 83 and conveyors 84, 85 to feed out the finished packages.

In the installation described above the invention is applied in the following manner: A sheet 87 (FIG. 7), preferably reject sheet, is carried from the feed table 63 through the installation in the manner described above and is cut into the pattern shown in FIG. 7. The three part-sheets 88 and 89 arrive on the stacking table 78 in the same relative positions, as shown in FIG. 7. Sheets 86 (FIG. 6) are now carried from the feed table 62 through the installation and are divided as shown in FIG. 6. Sixteen smaller sheets thus arrive on the stacking table 78 in the same relative positions, as seen in FIG. 6, i.e. twelve smaller sheets 75 and four smaller sheets 76. These smaller sheets will arrive on the part-sheets 88, 89 already on the stacking table, i.e. so that six smaller sheets 75 arrive on each of the part-sheets 88 and the four smaller sheets 76 arrive on the part-sheet 89. When the stacks on the stacking table 78 have reached the desired height, sawing is discontinued and the stacks are transported further and are wrapped as described in connection with FIGS. 1-4.

What is claimed is:

1. Method of sawing and stacking board, with the board including first sheets and second sheets each having a longitudinal dimension and a transverse dimension, comprising the steps of moving one first sheet over a first saw table for cutting the sheets in the longitudinal direction and over a second saw table for cutting the sheets in a transverse direction and cutting the one first sheet at least for trimming the longitudinal edges thereof, placing the cut first sheet on the support surface of a stacking table for forming a support for the bottom of a stack, moving a number of second sheets in series over the first saw table and over the second saw table and cutting each of the second sheets at least in one of the longitudinal and transverse directions for forming a plurality of sub-divided second sheets from each one of the second sheets moved over the first and second saw tables, each of the sub-divided second sheets having a combined area size equal to or less than the size of the cut first sheet placed on the support surface, and stacking these smaller sub-divided second sheets, while maintaining their positions in relation to each other, on the cut first sheet lying on the stacking table, so that the cut first sheet thus forms a supporting surface for the sub-divided second sheets cut from said second sheets of board.

2. Method according to claim 1 for sawing and stacking board including supplying first sheets and second sheets where the second sheets are approximately the same size in the longitudinal and transverse directions as the first sheets, cutting one first sheet in at least one of the longitudinal and transverse directions for forming at least two part-first sheets, placing these part-first sheets, while maintaining their position in relation to each other, on the stacking table, cutting the second sheets in the longitudinal direction and in the transverse direction for forming the plurality of sub-divided second sheets from each of the second sheets so that at least some of the sub-divided second sheets are smaller than the part-first sheets located on the stacking table, stacking the subdivided second sheets in a number of stacks on the part-first sheets, while maintaining their positions in relation to each other, on the part-first sheets lying on the stacking table, so that each part-first sheet thus forms a support surface for at least one stack of smaller second sheets with each stack of the sub-divided second sheets being supported on only one of the part-first sheets whereby the stacks of subdivided second sheets do not overlay more than one of the part-first sheets.

3. Method according to claim 2, comprising conveying second sheets to the first saw table and carrying out the step of dividing the second sheets in the longitudinal direction by a number of laterally spaced circular saw blades on the first saw table, conveying the previously subdivided second sheets from the first saw table onto the second saw table, further carrying out the step of dividing the second sheets in the transverse direction by a number of laterally spaced circular saw blades on the second saw table, and removing the two directionally divided second sheets from the second saw table and stacking of two directionally divided second sheets thus produced, characterized in moving a number of saw blades at the first and second saw tables into a position inoperative for sawing while retaining at least one of the saw blades located intermediate the sides of the sheets to be cut in operative position at each saw table, conveying a first sheet to the first and the second saw tables and dividing it into at least four part-support sheets as it moves over the saw tables, placing these part-support sheets, while maintaining their positions in relation to each other, on the stacking table, moving at least some of the saw blades at each of the first and second tables located between the sides of the sheets to be cut from the inoperative to the operative position, the said step of conveying a plurality of second sheets in series to the first and second saw tables including the steps of dividing them into smaller sub-divided second sheets smaller than the part-first sheets, stacking said smaller second sheets, while maintaining their position in relation to each other, on the part-support sheets produced previously and located at the stacking table.

4. Method according to claim 1, comprising conveying a first sheet to the first saw table containing a first cross-cut saw cutting in the longitudinal direction of the sheets, conveying said support sheet to a second saw table containing a second cross-cut saw cutting in the transverse direction of the sheets, dividing said first sheet into at least two part-first sheets by sawing it by at least one of said first and second cross-cut saws, placing said part-first sheets on the stacking table while maintaining their positions in relation to each other, conveying a plurality of second sheets in series to said first and second saw tables, dividing said second sheets into at least three smaller sheets by sawing them by at least one of said first and second cross-cut saws, and stacking said smaller second sheets, while maintaining their positions in relation to each other, on said part-first sheets previously produced, with at least one of said part-first sheets completely supporting at least two stacks of smaller second sheets.

5. Method of sawing and stacking board, with the board including first sheets and second sheets each having a longitudinal dimension and a transverse dimension, comprising the steps of moving one first sheet over a first saw table for cutting the sheets in the longitudinal direction and over a second saw table for cutting the sheets in a transverse direction and cutting the one first sheet at least for trimming the longitudinal and transverse edges thereof, placing the cut first sheet on the support surface of a stacking table for forming a support for the bottom of a stack, moving a number of second sheets in series over the first saw table and over the second saw table and trimming the longitudinal and transverse edges of said second sheets and cutting each of the second sheets at least in one of the longitudinal and transverse directions for forming a plurality of sub-divided second sheets from each one of the second sheets moved over the first and second saw tables, each of the sub-divided second sheets having a combined area size equal to or less than the size of the cut first sheet placed on the support surface, and stacking these smaller sub-divided second sheets, while maintaining their positions in relation to each other, on the cut first sheet lying on the stacking table, so that the cut first sheet thus forms a supporting surface for the sub-divided second sheets cut from said second sheets of board.

* * * * *